(12) United States Patent
Kapoor

(10) Patent No.: US 10,977,043 B2
(45) Date of Patent: Apr. 13, 2021

(54) TRANSACTIONAL MEMORY PERFORMANCE AND FOOTPRINT

(71) Applicant: International Business Machines Corporation, Armonk, NY (US)

(72) Inventor: Shakti Kapoor, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 434 days.

(21) Appl. No.: 15/704,759

(22) Filed: Sep. 14, 2017

(65) Prior Publication Data
US 2019/0079773 A1  Mar. 14, 2019

(51) Int. Cl.
G06F 9/30 (2018.01)
G06F 9/38 (2018.01)
G06F 3/06 (2006.01)
G06F 12/0866 (2016.01)

(52) U.S. Cl.
CPC .......... *G06F 9/3842* (2013.01); *G06F 3/0619* (2013.01); *G06F 3/0653* (2013.01); *G06F 9/30047* (2013.01); *G06F 12/0866* (2013.01)

(58) Field of Classification Search
None
See application file for complete search history.

(56) References Cited

U.S. PATENT DOCUMENTS

| | | | |
|---|---|---|---|
| 9,262,207 B2 | 2/2016 | Cain, III et al. | |
| 2002/0112129 A1* | 8/2002 | Arimilli | G06F 12/0811 711/141 |
| 2015/0347133 A1 | 12/2015 | Gschwind et al. | |
| 2016/0092354 A1* | 3/2016 | Steely, Jr. | G06F 12/0811 711/141 |
| 2016/0246654 A1 | 8/2016 | Busaba et al. | |

OTHER PUBLICATIONS

Anonymous "Mechanism to Support Speculation Decisions in a Computer System with Hardware Transactional Memory" IP.com; IP.com No. IPCOM000225652D; Feb. 25, 2013; 4 pgs.
Diestelhorst et al., "Between All and Nothing—Versatile Aborts in Hardware Transactional Memory" TRANSACT 15; Jun. 15-16, 2015; 10 pgs.
IBM "A conflict-hinted method for thread scheduling optimization in transactional memory system" IP.com; IP.com No. IPCOM000174228D; Sep. 3, 2008; 14 pgs.

(Continued)

*Primary Examiner* — Corey S Faherty
(74) *Attorney, Agent, or Firm* — Cantor Colburn LLP; Bryan Bortnick

(57) ABSTRACT

Embodiments of the invention are directed to methods for handling cache. The method includes retrieving a plurality of instructions from a cache. The method further includes placing the plurality of instructions into an instruction fetch buffer. The method includes retrieving a first instruction of the plurality of instructions from the instruction fetch buffer. The method includes executing the first instruction. The method includes retrieving a second instruction from the plurality of instructions from the instruction fetch buffer unless a back invalidate is received from the cache. Thereafter executing the second instruction without refreshing the instruction fetch buffer from the cache.

12 Claims, 7 Drawing Sheets

(56) References Cited

OTHER PUBLICATIONS

IBM "A dedicated buffer based transactional memory system with two-phase content support" IP.com; IP.com No. IPCOM000180978D; Mar. 23, 2009; 3 pgs.
Kapoor et al., "Improving Transactional Memory Performance and Footprint" U.S. Appl. No. 15/813,336, filed Nov. 15, 2017.
List of IBM Patents or Patent Applications Treated As Related; Date Filed: Nov. 15, 2017, 2 pages.

* cited by examiner

TRANSACTIONAL MEMORY PERFORMANCE AND FOOTPRINT

BACKGROUND

The present invention relates in general to the field of computing. More specifically, the present invention relates to systems and methodologies for improving the performance of an instruction cache of a processor.

Computer systems that allow multiple concurrently executing threads sometimes allow access to shared memory location. Writing multi-threaded programs can be difficult due to the complexities of coordinating concurrent memory access. One approach to controlling concurrent access is the use of transactional memory. In a transactional memory system, a section of code can be designated to be a transaction. The transaction executes atomically with respect to other threads of execution within the transactional memory system. For example, if the transaction includes two memory write operations, then the transactional memory system ensures that all other threads may only observe the cumulative effects of both memory operations or of neither, but not the effects of only one memory operation.

Current implementations of transactional memory limit the number of cache lines (transaction footprint) in a transaction for several different reasons. A transaction is aborted if the core sends out additional cache line requests that are not related to the transactions that will force the eviction of transaction cache lines from the caches, thus impacting the performance of the transaction. Transactional memory can sometimes affect instruction fetches, negatively impacting the performance of processors.

SUMMARY

Embodiments of the invention are directed to methods for handling cache. The method includes retrieving a plurality of instructions from a cache. The method further includes placing the plurality of instructions into an instruction fetch buffer. The method includes retrieving a first instruction of the plurality of instructions from the instruction fetch buffer. The method includes executing the first instruction. The method includes retrieving a second instruction from the plurality of instructions from the instruction fetch buffer unless a back invalidate is received from the cache. Thereafter executing the second instruction without refreshing the instruction fetch buffer from the cache.

Embodiments of the present invention are further directed to a computer system handling cache prefetch requests. The computer system includes a cache memory and a processor system communicatively coupled to the cache memory. The processor system is configured to perform a method. The method includes retrieving a plurality of instructions from a cache. The method further includes placing the plurality of instructions into an instruction fetch buffer. The method includes retrieving a first instruction of the plurality of instructions from the instruction fetch buffer. The method includes executing the first instruction. The method includes retrieving a second instruction from the plurality of instructions from the instruction fetch buffer unless a back invalidate is received from the cache. Thereafter executing the second instruction without refreshing the instruction fetch buffer from the cache.

Embodiments of the present invention are further directed to a design structure embodied in a machine-readable storage medium for designing, manufacturing, or testing an integrated circuit. The design structure comprises includes a cache memory and a processor system communicatively coupled to the cache memory. The processor system is configured to perform a method. The method includes retrieving a plurality of instructions from a cache. The method further includes placing the plurality of instructions into an instruction fetch buffer. The method includes retrieving a first instruction of the plurality of instructions from the instruction fetch buffer. The method includes executing the first instruction. The method includes retrieving a second instruction from the plurality of instructions from the instruction fetch buffer unless a back invalidate is received from the cache. Thereafter executing the second instruction without refreshing the instruction fetch buffer from the cache.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
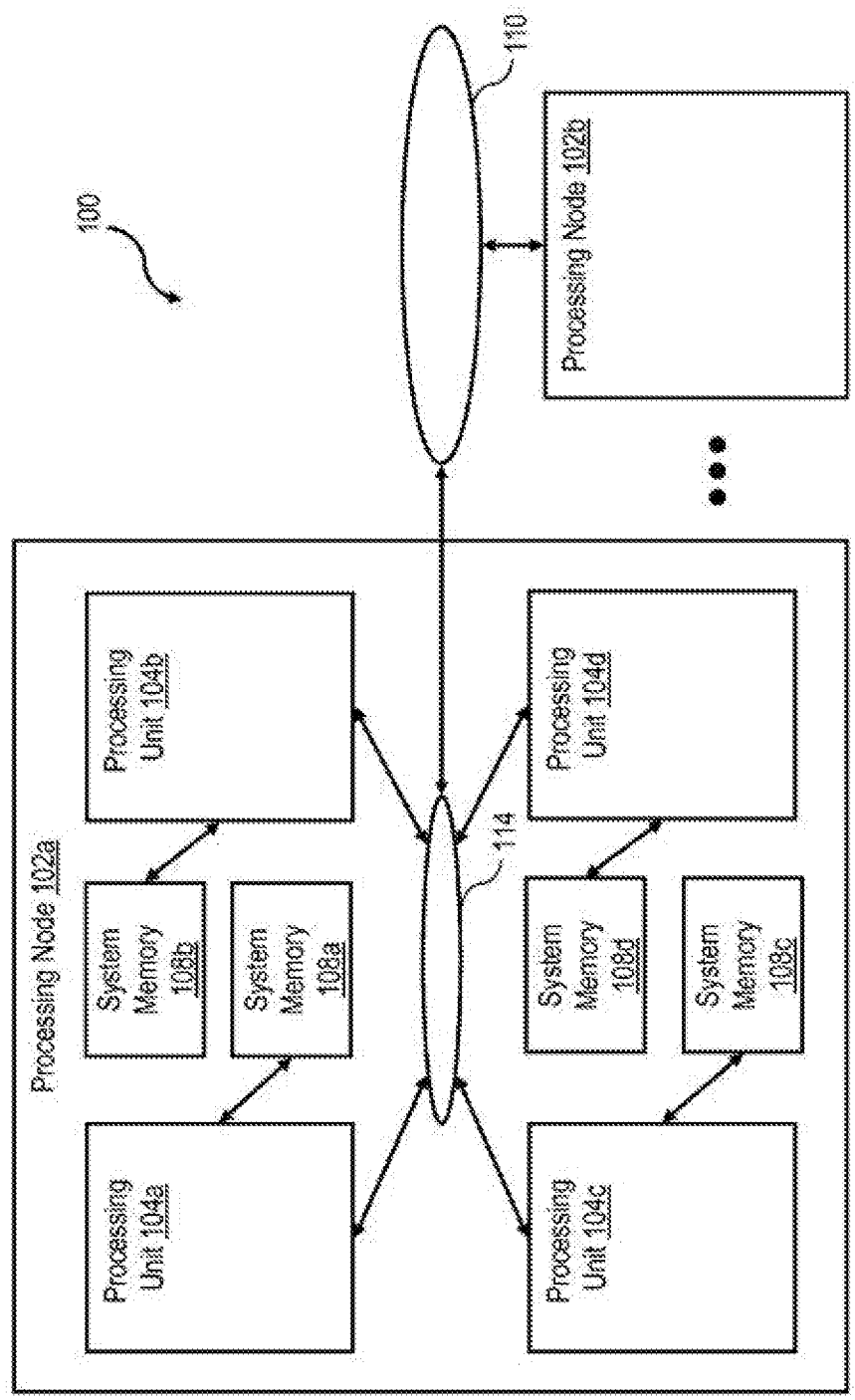
FIG. 1 depicts an overview of a data processing system according to embodiments of the invention.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of usage with specific devices is included herein, implementation of the teachings recited herein are not limited to embodiments described herein. Rather, embodiments are capable of being implemented in conjunction with any other type of electronic device, now known or later developed.

At least the features and combinations of features described in the present application, including the corresponding features and combinations of features depicted in the figures amount to significantly more than implementing a method of maging transactional memory. Additionally, at least the features and combinations of features described in the immediately following paragraphs, including the corresponding features and combinations of features depicted in the figures go beyond what is well understood, routine and conventional in the relevant field(s).

Shared memory occurs in computing systems that have multiple threads and/or multiple cores and/or multiple users. An exemplary issue that can occur with shared memory is when two different processes attempt to read or write the same memory location simultaneously.

Figure 3:
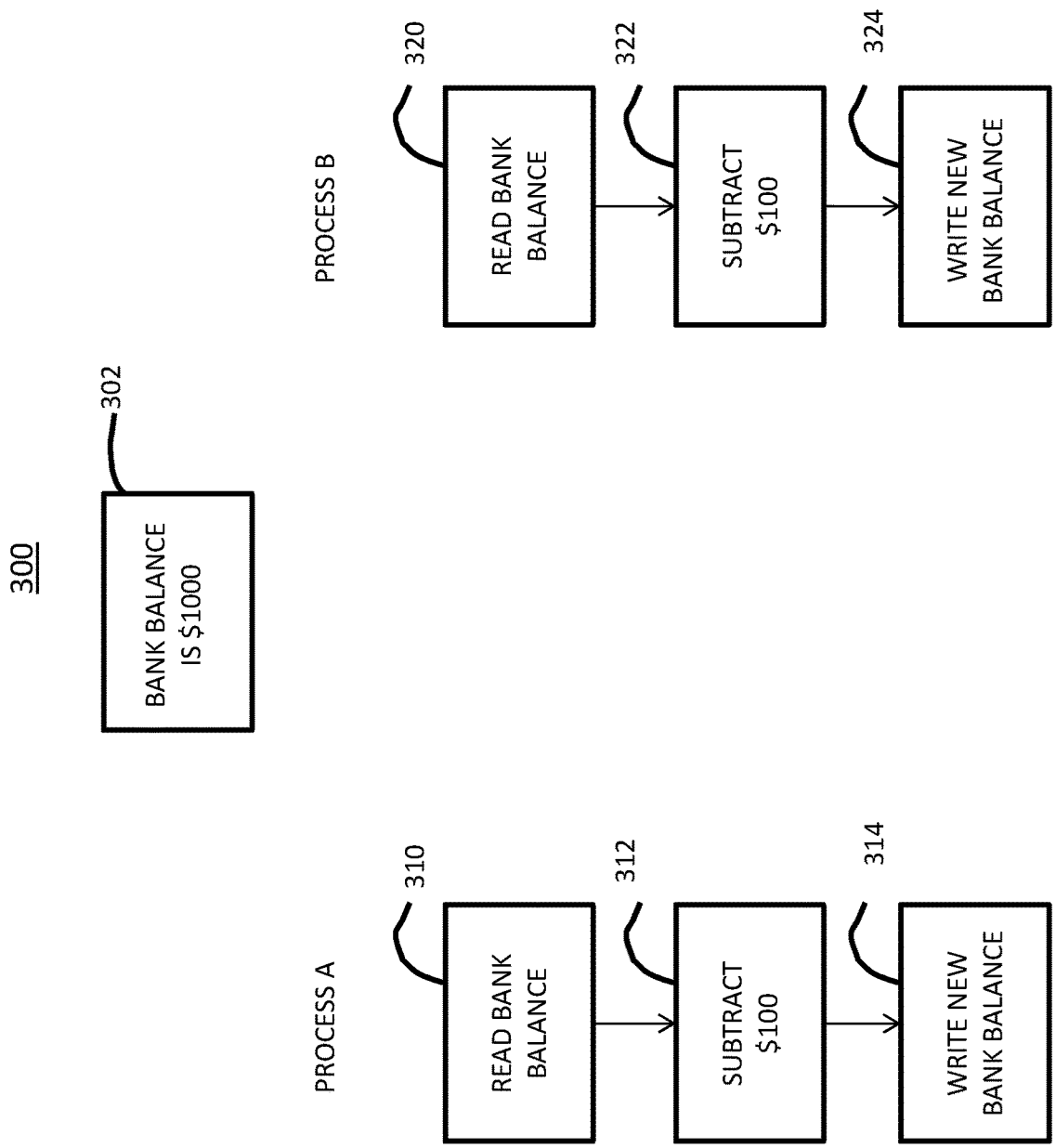
FIG. 3 depicts a flow diagram illustrating a situation that can occur with shared memory.

To provide an exemplary, simplified situation, refer to the flowchart of FIG. 3. Imagine a program that updates a bank balance. The bank balance starts at $1,000 (block 302). Process A and Process B simultaneously perform. Process A reads the bank balance (block 310), then updates the bank balance by withdrawing $100 (block 312) and writing the new balance (block 314). Process B reads the bank balance (block 320), then attempts to update the bank balance by depositing $200 (block 322) and writing the new balance (block 324).

If Process A and Process B occur sequentially in either order, the result is a balance of $1,100 ($1,000−$100+$200). However, if block 220 occurs after block 210 but prior to block 210, then Process B reads the balance value before Process A has finished. The result is that both Process A and Process B attempt to write at the same time, then both are adding or subtracting the value from the same balance value. The result is either a failure to write or the wrong value is written into the bank balance feed.

One method of addressing such a situation is the use of a lock. When Process A reads the balance, it locks the memory address of the balance. Therefore, Process B cannot read the balance can obtain incorrect information. Once Process A is finished with its task, it unlocks the memory address, which allows Process B to perform.

While such a process can solve the problem of two processes simultaneously reading or writing the same memory location, other problems can be caused by such a lock procedure. For example, overhead is incurred by the use of the locks, Process B might sit idle while waiting for the release of a lock, and the potential of a deadlock, where two processes are waiting for the other process to release a lock in order to perform a particular function. Because both processes are dependent on each other, the deadlock prevents either process from finishing. While a case of two processes can be relatively simple to avoid a deadlock, a multi-threaded or multi-processor machine can make it more difficult to avoid the deadlock. There are other shortcomings of locking. These shortcomings can include the possibility of a deadlock when a given thread holds more than one lock and prevents the forward progress of other threads. In addition, there is a performance cost to lock acquisition which might not have been necessary because no conflicting accesses would have occurred.

One type of memory system that addresses such problems is transactional memory. Transactional memory simplifies parallel programming by grouping read and write operations and performing them like a single operation. Transactional memory is similar to database transactions where all shared memory accesses and their effects are either committed together or discarded together as a group. All threads can enter the critical region simultaneously. If there are conflicts in accessing the shared memory data, threads try accessing the shared memory data again or are stopped without updating the shared memory data. Therefore, transactional memory can be considered lock-free synchronization. A traditional lock scheme would involve a process locking a memory location, performing operations on the locked memory location, and then releasing the lock. In contrast, a transactional scheme involves a process declaring a memory location to be atomic, then performing transactions on a copy of the memory location. Upon completion of the process, the processor (also known as a central processing unit or CPU) determines if there are any conflicts. If there are conflicts, then transaction fails and has to try again. However, if there are no conflicts, then the transaction succeeds and the memory changes are made permanent. An advantage of transactional memory is that if there is no direct conflict between two memory locations, then two processes can operate in parallel, instead of having to wait for a lock to be released. The memory locations involved in the transaction can be called a transaction footprint.

With continued reference to FIG. 3, in a transactional memory system, process A, comprising blocks 310, 312, and 314, is considered one transaction and process B, comprising block 320, 322, and 324, is considered a second transaction. Process A copies the bank balance to a first temporary memory location, then completes blocks 312 and 314. Process B copies the bank balance to a second temporary memory location, then completes blocks 312 and 314. After Process A is complete, it determines if any other action was taken with respect to the bank balance. If not, then the new bank balance is written to the permanent memory location. However, if after Process A completes, it turns out that Process B has not completed, then Process A is aborted and has to start again. In such a manner, there is no overwriting of data by other processes and there is no need to perform a memory lock.

Figure 4:
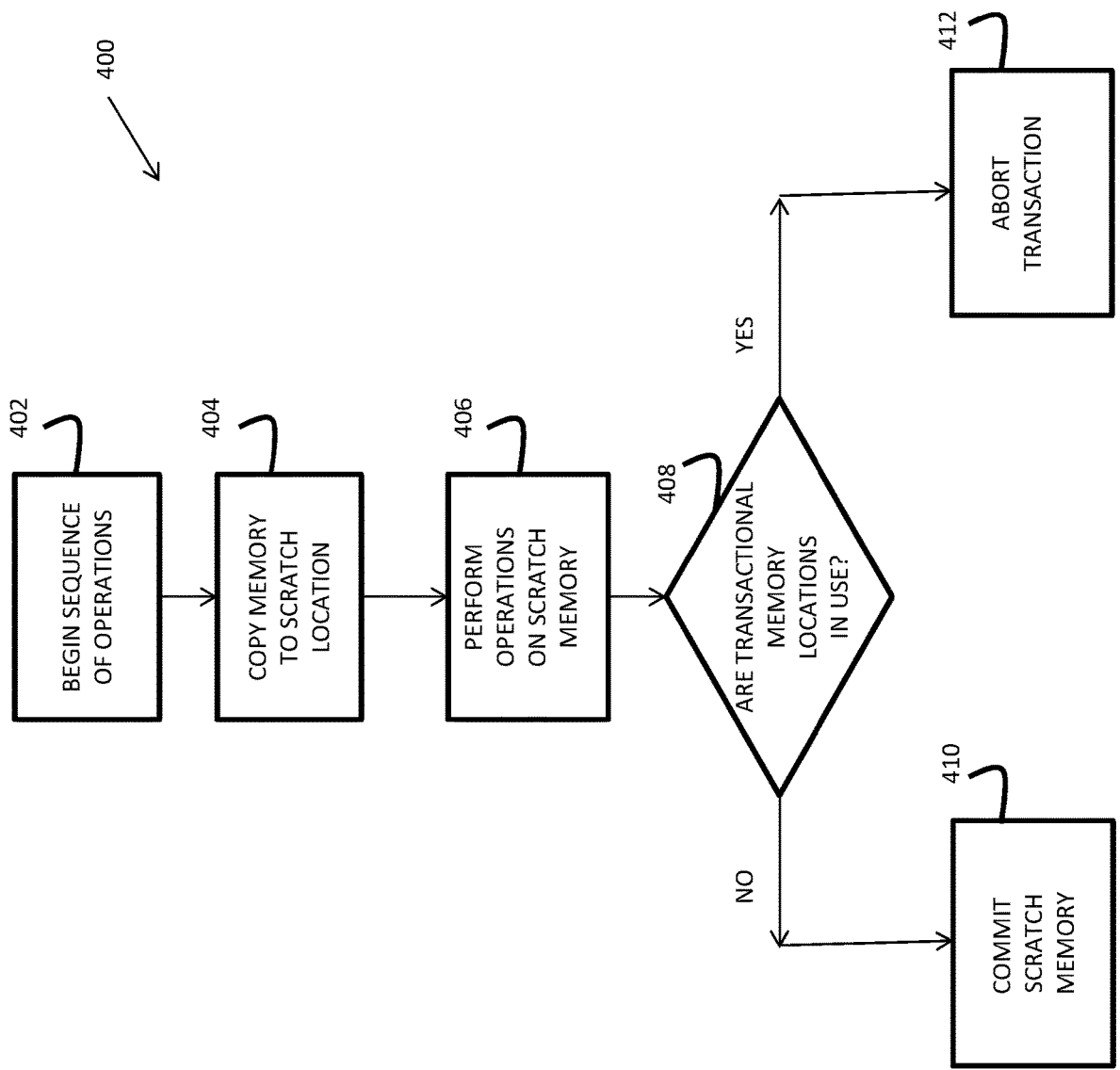
FIG. 4 depicts a flow diagram illustrating the operation of a transactional memory system.

A flowchart illustrating method 400 is presented in FIG. 4. Method 400 is merely exemplary and is not limited to the embodiments presented herein. Method 400 can be employed in many different embodiments or examples not specifically depicted or described herein. In some embodiments, the procedures, processes, and/or activities of method 400 can be performed in the order presented. In other embodiments, one or more of the procedures, processes, and/or activities of method 400 can be combined or skipped. In one or more embodiments, method 400 is performed by a processor as it is executing instructions.

Method 400 is a simplified flowchart illustrating the operation of the transactional memory. It should be understood that other implementations of transactional memory are possible. A sequence of operations begins (block 402). A set of memory locations are copied to a "scratch" or temporary memory location (block 404). These are considered the transactional memory locations. Operations are then performed on the scratch memory locations (406). After the transaction block is finished processing, it is determined if the set of transactional memory locations are being operated upon by another sequence (block 408). Such a determination can occur using a form of transactional memory logic. The transactional memory logic includes entries that indicate which areas of memory are being used for transactional memory. If the determination shows that the memory locations are not being used, then the transaction is finalized by committing the scratch memory to the set of memory locations (block 410). Otherwise, the transaction is aborted and started again (block 412).

With reference to both FIG. 3 and FIG. 4, if Process A completes before Process B ever begins, then block 410 will execute. However, if Process B starts after Process A starts, but before it finishes, block 412 will occur for Process A because, from the perspective of Process A, the memory location is in use. However, Process B might finish and commit prior to Process A re-starting.

Thus, it can be seen that there are some advantages to transactional memory. The overhead of obtaining a memory lock was prevented and Process B was not required to remain idle while waiting for a memory lock to be released. While this was a simplified example showing only two processes running on two cores, if you have multiple parallel operations which access a data structure, all of which are capable of writing to it, but few of which actually do, then lock-based memory synchronization may require that all such operations be run serially to avoid the chance of data corruption. Transactional memory can allow almost all the operations to be executed in parallel, only losing parallelism when some process actually does write to the data structure.

A cache is a set of small, fast area of memory that a processor uses to process data more quickly. Because cache memory is faster than system memory (such as RAM), a processor can access cache memory more quickly and thus not be burdened by a slow system memory.

Cache memories are commonly utilized to temporarily buffer memory blocks that might be accessed by a processor in order to speed up processing by reducing access latency introduced by having to load needed data and instructions from slower system memory. In some embodiments, the level one (L1) cache is associated with one particular processor core and cannot be accessed by other cores. In some embodiments, there can be more than one L1 cache for a processor core. For example, there could be an L1 data cache and an L1 instruction cache. The operation of such an embodiment will be discussed in further detail below. Typically, in response to a memory access instruction such as a load or store instruction, the processor core first accesses the directory of the upper-level cache. If the requested memory block is not found in the upper-level cache, the processor core can then access lower-level caches such as level 2 (L2) or level 3 (L3) caches or system memory for the requested memory block. The lowest level cache (L3 in some embodiments, level 4 (L4) or level 5 (L5) in other embodiments) can be shared among several processor cores.

With reference to FIG. 1, there is illustrated a high-level block diagram depicting an exemplary data processing system 100 in accordance with one embodiment. In the depicted embodiment, data processing system 100 is a cache-coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Figure 2:
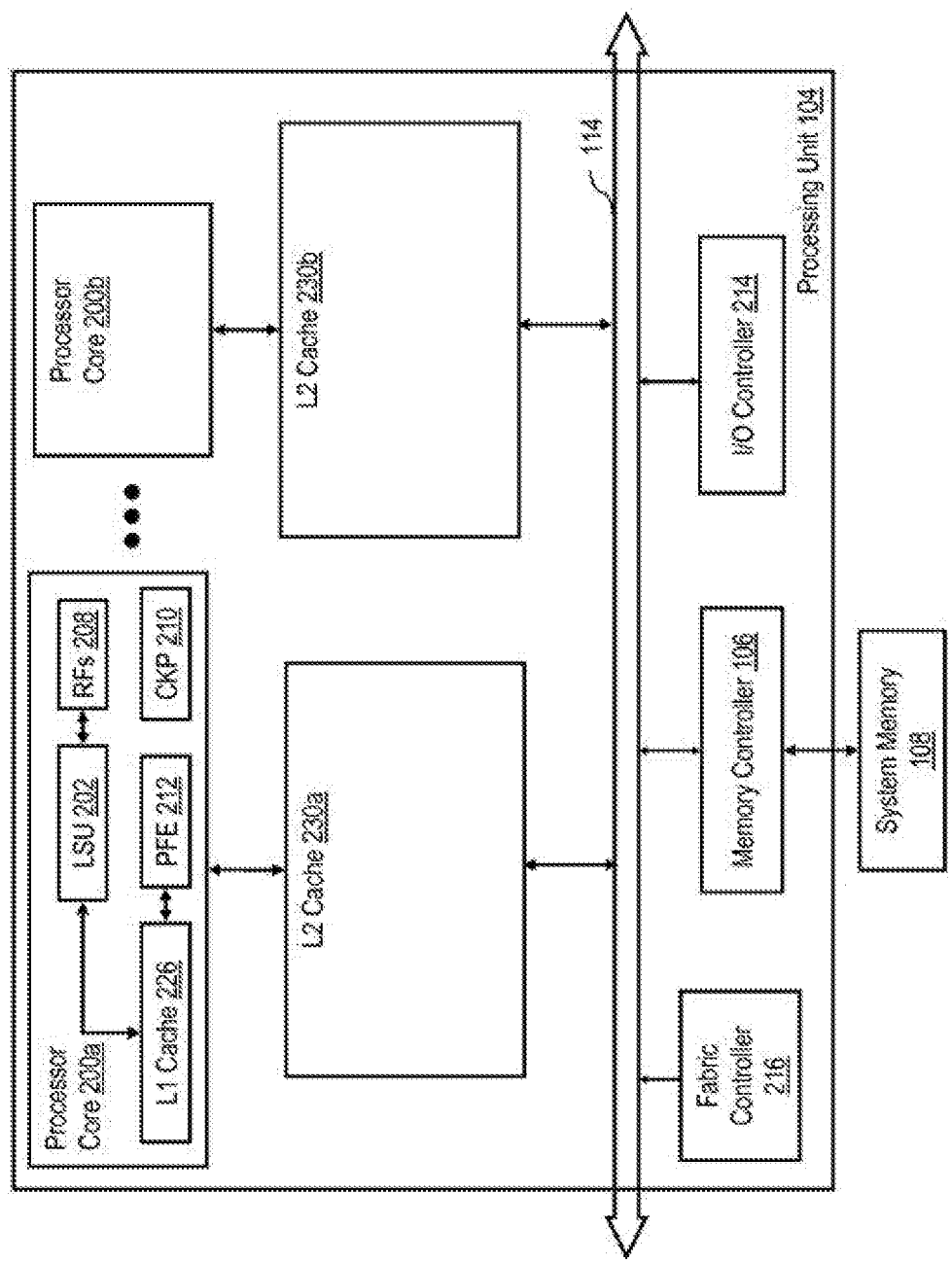
FIG. 2 depicts a more detailed block diagram flow diagram of a data processing system according to embodiments of the invention.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In a preferred embodiment, each processor core 200 is capable of independently executing multiple hardware threads of execution simultaneously. However, in the following description, unless the interaction between threads executing on a same processor core is relevant in a particular context, for simplicity, terms "processor core" and "thread executing on a processor core" are used interchangeably. As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208.

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 226 within and private to each processor core 200, and a respective store-in level two (L2) cache 130 for each processor core 200a, 200b. In order to efficiently handle multiple concurrent memory access requests to cacheable addresses, each L2 cache 130 can be implemented with multiple L2 cache slices, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. The processing unit 104 further includes an integrated I/O (input/output) controller 214 supporting the attachment of one or more I/O devices (not depicted).

In operation, when a hardware thread under execution by a processor core 200 includes a memory access instruction requesting a specified memory access operation to be performed, LSU 202 executes the memory access instruction to determine the target address (e.g., an effective address) of the memory access request. After translation of the target address to a real address, L1 cache 226 is accessed utilizing the target address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 130 for servicing.

It will also be appreciated by those skilled in the art that access latency can be improved by prefetching data that is likely to be accessed by a processor core 200 into one or more levels of the associated cache hierarchy in advance of need. Accordingly, the processing unit 104 can include one or more prefetch engines, such as prefetch engine (PFE) 212, that generate prefetch load requests based on historical demand access patterns of processor cores 200.

With prefetching, instead of retrieving data from system memory exactly when it is needed, a prediction is made as to what data will be needed in the future. Based on the prediction, data is fetched from system memory 108 to L2 cache 230a or 230b (or sometimes directly to L1 cache 226). If L2 cache 230a is full when prefetch data is written to it, part of the L2 cache 230a is overwritten with the new prefetch data.

A cache is written to in increments that are sometimes referred to as a "cache line." The number of cache lines in a cache depends on both the size of the cache line (typically between 4 and 128 bytes) in addition to the size of the cache.

Figure 7:
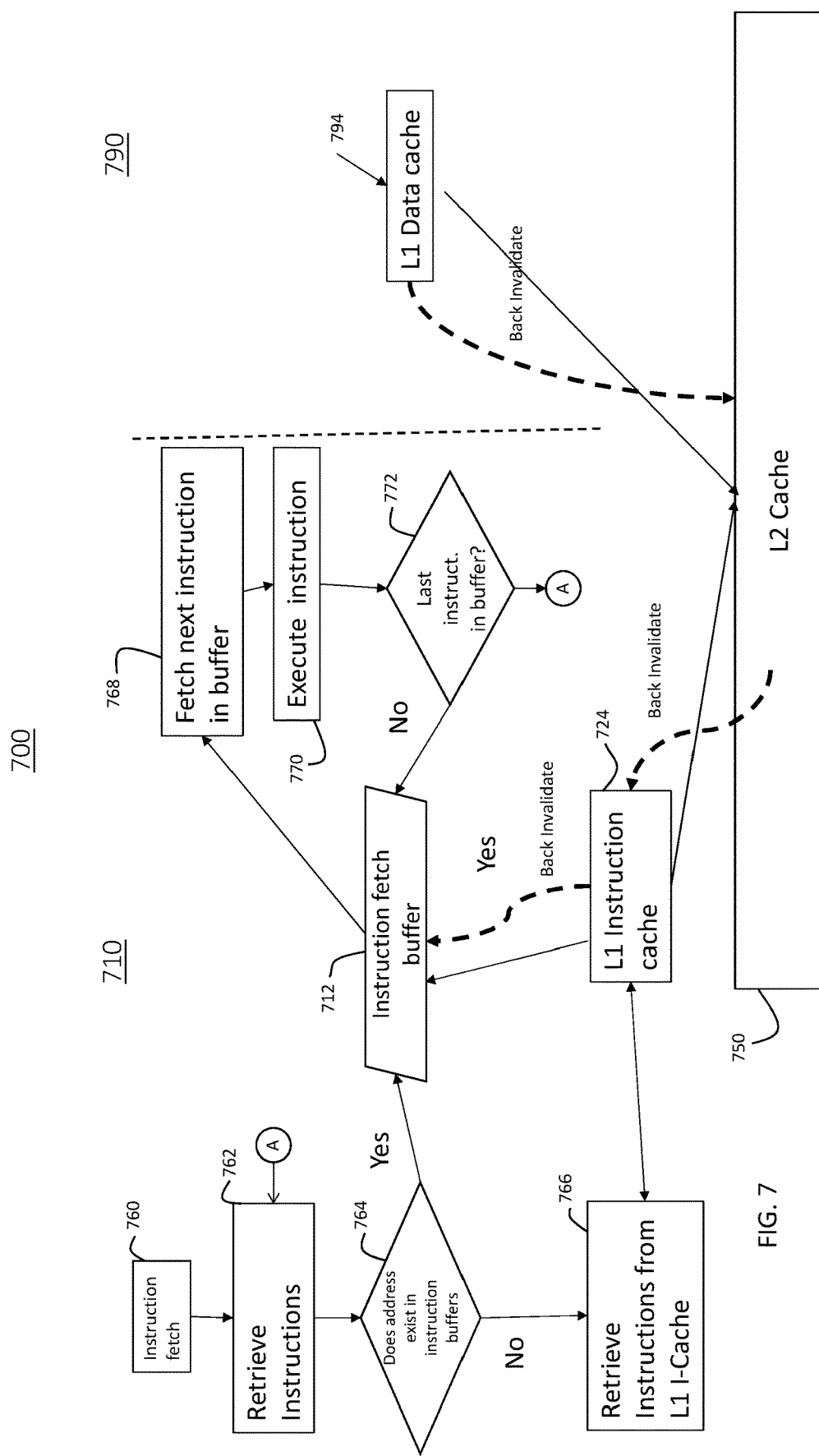
FIG. 7 depicts the flow of instructions from cache through a processor.

With reference to FIG. 7, a flow diagram of an exemplary processor 700 is presented. FIG. 7 shows various parts of processor 700 as well as illustrating a flow diagram. Processor 700 includes a load store unit (LSU) 790 and an instruction fetch unit (IFU) 710. LSU 790 includes an L1 data cache 794.

IFU 710 includes an L1 instruction cache 724 and an instruction fetch buffer 712. Both L1 data cache 794 and L1 instruction cache 724 are coupled to L2 cache 750. L2 cache 750 can receive data from L1 data cache or LSU 790 to be stored later in a main memory (not illustrated).

When IFU 710 is to fetch an instruction, it does so through instruction fetch buffer 712. After executing the instruction, the next instruction is also retrieved from instruction fetch buffer 712. If the instruction does not exist in instruction fetch buffer 712, then a set of instructions are fetched from L1 instruction cache 724 into instruction fetch buffer 712. The number of instructions fetched from L1 instruction cache 724 into instruction fetch buffer 712 can depend on the size of instruction fetch buffer 712.

An inefficiency can occur in the fetching of instructions. This inefficiency can be seen in the case of a loop of instructions. As described above, IFU 710 fetches instructions from instruction fetch buffer 712 until the next instruction needed is not present. From here, the instruction is fetched from L1 instruction cache 724. In the case of a loop, however, the next instruction can be an instruction that was fetched fairly recently. In a small enough instruction loop (a loop smaller than the size of instruction fetch buffer 712, for example), the instruction to be executed next might already be in instruction fetch buffer 712. For example, if the instruction buffer can hold eight instructions, and the size of instruction fetch buffer 712 is eight instructions, then the first through eighth instruction are performed. However, after the eighth instruction is performed, the first instruction is performed again. But, in prior processors, an instruction buffer is not made aware of such a situation. Therefore, after the eighth instruction is executed, the entire loop is retrieved again from L1 instruction cache 724.

A problem can occur when the cache is used in conjunction with transactional memory. As described above, in transactional memory, a portion of memory is copied to a temporary memory, operations are performed on the temporary memory, then the temporary memory is committed to main memory if certain conditions are met (such as the memory locations not being used by other processes).

In some instances, after executing an instruction that is located in the instruction fetch buffer 712, instruction fetch buffer 712 is refilled from L1 cache 724. In order to refill instruction fetch buffer 712, the instructions must first be loaded into L1 cache 724 and/or L2 cache 750. By this time the original instruction cache line has been evicted by virtue of other instructions or instruction prefetch into L1. So the L1 requests the L2 to provide the cache line. At this time the original instruction cache line may have been evicted from L2 also. This creates an issue when transactional memory is being used. Instructions have priority over transactional memory, thus some cache line of L2 cache 750 are flushed or evicted prior to retrieving instructions from memory. Refetching L1 cache 724 causes a fetch of L2 cache 750. If L2 cache 750 contained modified transactional memory, the transaction is aborted. Thus, the contents of transactional memory and the instructions for which the transaction will be used have to be re-loaded.

For example, there may be a transactional memory loop X that is being executed that belongs to the instruction cache line Y of L1 cache congruence class Z. Transactional memory loop X is contained in cache line Y. In such a situation, cache line Y would have been fetched into the instruction fetch buffer (such as instruction fetch buffer 712).

On a subsequent iteration of the transaction loop (e.g., a previous transaction failed and it needed to be re-executed), the instructions will be fetched again from L1 cache 724 or L2 cache 750 to the instruction fetch buffer 712, even though the same instructions are being executed again. In this subsequent iteration, the instructions might not be in L1 cache 724. The instructions could have been evicted for one of several different reasons.

For example, there may be a speculative execution of instructions that fetch from L1 cache 724 or L2 cache 750. It may be a separate cache line W that was rolled into L1 cache 724, evicting cache line Y.

In another example, an instruction issued by the processor thread may cause a prefetch of another cache line V into L1 cache 724, thus evicting cache line Y.

After there is an instruction cache miss of L1 cache 724 for cache line Y (which was evicted, as described above), the request is sent to L2 cache 750. If there is a transaction in L2 cache 750, then bringing in any new cache lines in L2 cache 750 will evict some of the transaction modified lines. This causes an abort of the transaction, meaning the transaction will need to be re-loaded. Overwriting transactional memory will result in the failure of the transactional memory operation, requiring the operation to be executed again, slowing down the processing speed of processor 700.

Embodiments of the present invention address the above-described issues by using a novel method and system to handle interactions between a cache and transactional memory. Instruction fetch buffer 712 is re-used instead of being re-fetched from L1 cache 724. In such a manner, there is no chance of overwriting a transaction that is currently in L1 cache 724 or L2 cache 750.

Figure 5:
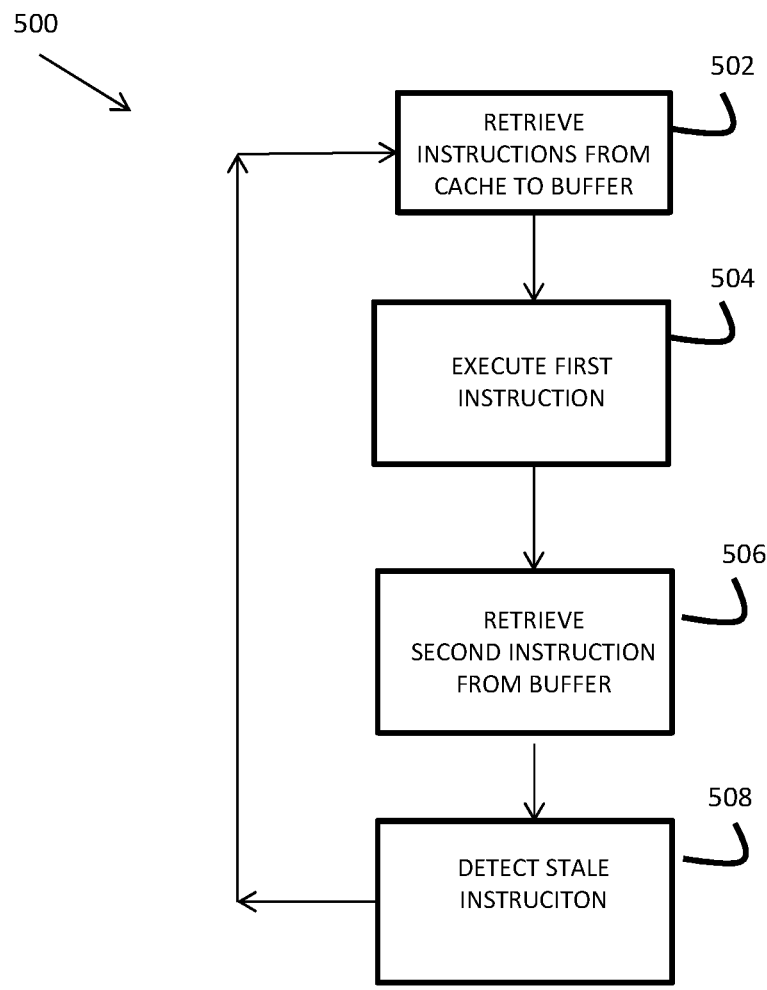
FIG. 5 depicts a flow diagram illustrating the operation of one or more embodiments.

A flowchart illustrating method 500 is presented in FIG. 5. Method 500 is merely exemplary and is not limited to the embodiments presented herein. Method 500 can be employed in many different embodiments or examples not specifically depicted or described herein. In some embodiments, the procedures, processes, and/or activities of method 500 can be performed in the order presented. In other embodiments, one or more of the procedures, processes, and/or activities of method 500 can be combined or skipped. In one or more embodiments, method 500 is performed by a processor as it is executing instructions.

A set of instructions are forwarded from a cache to an instruction fetch buffer (block 502). In some embodiments, the cache is an L1 cache. Thereafter, the first instruction of the set of instructions are executed (block 504).

When it is time for a second instruction of the set of instructions to be executed, the second instruction is retrieved from the instruction fetch buffer (block 506). In such a manner, information does not have to be retrieved from L1 cache or L2 cache, thus preventing instruction cache from interfering with transactional memory operations by overwriting any transactional memory locations in the L2 cache or L1 cache.

In the case that an instruction has become stale (e.g., due to being performed on invalid data), an error will be returned (block 508). For example, data referred to in an instruction can become stale.

The error can be returned by the L1 cache. For example, the L1 cache can monitor which instructions are in the instruction fetch buffer. This can involve monitoring the memory locations of the instructions and any data referred to in the instructions. In the case of a stale instructions, a "back invalidate" can be issued by the L1 cache to the instruction fetch buffer. When the back invalidate is sensed, operation returns to block 502 with the retrieval of instructions from a cache into the instruction fetch buffer.

In the above-described manner, fewer instructions are transferred from L2 cache and L1 cache into the instruction fetch buffer. Because L2 cache and L1 cache are used less often for instructions, there is a lessened potential for the overwriting of transactional memory (which may be present in L2 cache or L1 cache). The instruction fetch buffer can be reused in the case of a loop, for example, instead of being re-fetched from L2 cache.

With reference now to FIG. 7, an illustration of how the back invalidate is processed is presented. An instruction fetch is initiated (block 760). A request to retrieve instructions is issued (block 762). It is determined if the address requested exists in the instruction fetch buffer 712 (block 764). While only a single instruction fetch buffer 712 is shown in FIG. 7, it should be understood that some embodiments can include multiple instruction fetch buffers.

If the address requested does not exist in the instruction fetch buffer, then instructions are retrieved from L1 cache 724 (block 766). From L1 cache 724, the instructions are sent to instruction fetch buffer 712 and are then fetched (block 768). The instruction is then executed (block 770). If the last instruction in the instruction fetch buffer has been executed, then the method goes to block 762, where additional instructions are retrieved. Otherwise, instructions are fetched from instruction fetch buffer 712 and the method goes to block 768.

In such a manner, instructions are fetched from instruction fetch buffer 712, lessening the need to retrieve instructions from L1 cache 724 or L2 cache 750. However, if an instruction in instruction fetch buffer 712 has become stale then a back invalidate is propagated to instruction fetch buffer 712. This is illustrated in the form of the dashed line. The back invalidate can originate in L1 cache 724, L2 cache 750, or L1 data cache 794. The instruction can be noted as being stale if data being referred to by the instruction has been changed or in a variety of other different manners.

Figure 6:
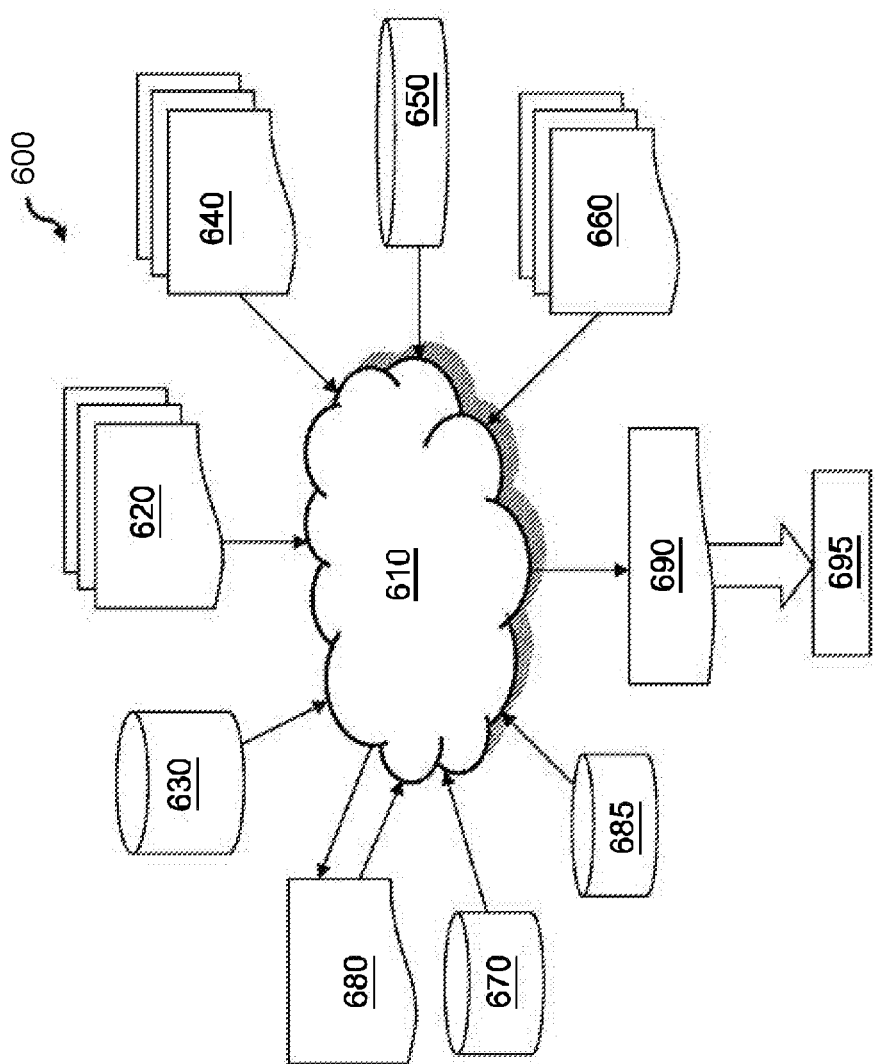
FIG. 6 depicts a data flow diagram illustrating a design process.

With reference now to FIG. 6, there is depicted a block diagram of an exemplary design flow 600 used for example, in semiconductor IC logic design, simulation, test, layout, and manufacture. Design flow 600 includes processes, machines and/or mechanisms for processing design structures or devices to generate logically or otherwise functionally equivalent representations of the design structures and/or devices described above. The design structures processed and/or generated by design flow 600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 600 may vary depending on the type of representation being designed. For example, a design flow 600 for building an application specific IC (ASIC) may differ from a design flow 600 for designing a standard component or from a design flow 600 for instantiating the design into a programmable array, for example a programmable gate array (PGA) or a field programmable gate array (FPGA).

FIG. 6 illustrates multiple such design structures including an input design structure that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD)

such as implemented by a core developer/designer. When encoded on a machine-readable data transmission, gate array, or storage medium, design structure 620 may be accessed and processed by one or more hardware and/or software modules within design process 610 to simulate or otherwise functionally represent an electronic component, circuit, electronic or logic module, apparatus, device, or system such as those described above. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown above to generate a netlist 680 which may contain design structures such as design structure 620. Netlist 680 may comprise, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which netlist 680 is resynthesized one or more times depending on design specifications and parameters for the device. As with other design structure types described herein, netlist 680 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 610 may include hardware and software modules for processing a variety of input data structure types including netlist 680. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 685 which may include input test patterns, output test results, and other testing information. Design process 610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 610 without deviating from the scope and spirit of the invention. Design process 610 may also include modules for performing standard circuit design processes such as timing analysis, verification, design rule checking, place and route operations, etc.

Design process 610 employs and incorporates logic and physical design tools such as HDL compilers and simulation model build tools to process design structure 620 together with some or all of the depicted supporting data structures along with any additional mechanical design or data (if applicable), to generate a second design structure 690. Design structure 690 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown above. In one embodiment, design structure 690 may comprise a compiled, executable HDL simulation model that functionally simulates the devices shown above.

Design structure 690 may also employ a data format used for the exchange of layout data of integrated circuits and/or symbolic data format (e.g., information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown above. Design structure 690 may then proceed to a stage 695 where, for example, design structure 690: proceeds to tape-out, is released to manufacturing, is released to a mask house, is sent to another design house, is sent back to the customer, etc.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiments were chosen and described in order to best explain the principles of operation and the practical application, and to enable others of ordinary skill in the art to understand embodiments of the present invention for various embodiments with various modifications as are suited to the particular use contemplated.

What is claimed is:

1. A computer system for handling cache prefetch requests, the computer system comprising:
   a cache memory; and
   a processor system communicatively coupled to the cache memory;
   the processor system configured to:
      retrieve a plurality of instructions from a cache;
      place the plurality of instructions into an instruction fetch buffer;
      retrieve a first instruction of the plurality of instructions from the instruction fetch buffer;
      execute the first instruction successfully;
      based on a determination that a back invalidate has not been received from the cache, retrieve a second instruction from the plurality of instructions from the instruction fetch buffer and execute the second instruction without refreshing the instruction fetch buffer from the cache while preserving the plurality of instructions in the instruction fetch buffer, wherein the plurality of instructions are part of a single transaction;
      responsive to at least one of the plurality of instructions executing unsuccessfully, re-try to execute the plurality of instructions that are stored in the instruction fetch buffer without re-fetching the plurality of instructions from the cache; and
      responsive to executing the second instruction and any remaining instructions in the plurality of instructions successfully, refresh the instruction fetch buffer by retrieving one or more additional instructions from the cache to replace the plurality of instructions in the instruction fetch buffer.

2. The computer system of claim 1 wherein the processor system is further configured to:
   based on the back invalidate being received, retrieving a second plurality of instructions from the cache into the instruction fetch buffer.

3. The computer system of claim 2 wherein the processor system is further configured to:
   determining that data referred to in the second instruction has become stale; and
   issuing the back invalidate to the instruction fetch buffer.

4. The computer system of claim 3 wherein determining that data referred to in the second instruction has become stale comprises monitoring memory locations referred to in the second instruction and issuing a back invalidate if the memory locations referred to in the second instruction have changed.

5. The computer system of claim 1 wherein the cache comprises an L1 cache.

6. The computer system of claim 5 wherein the L1 cache is configured to retrieve data from an L2 cache prior to attempting to retrieve data from a main memory.

7. A design structure tangibly embodied in a machine-readable storage medium for designing, manufacturing, or testing an integrated circuit, the design structure comprising:
   a cache memory; and
   a processor core coupled to the cache memory, the processor core configured to:
      retrieve a plurality of instructions from a cache;
      place the plurality of instructions into an instruction fetch buffer;
      retrieve a first instruction of the plurality of instructions from the instruction fetch buffer;
      execute the first instruction successfully;
      based on a determination that a back invalidate has not been received from the cache, retrieve a second instruction from the plurality of instructions from the instruction fetch buffer and execute the second instruction without refreshing the instruction fetch buffer from the cache while preserving the plurality of instructions in the instruction fetch buffer, wherein the plurality of instructions form a single transaction;
      responsive to at least one of the plurality of instructions executing unsuccessfully, re-try to execute the plurality of instructions that are stored in the instruction fetch buffer without re-fetching the plurality of instructions from the cache; and
      responsive to executing the second instruction and any remaining instructions in the plurality of instructions successfully, refresh the instruction fetch buffer by retrieving one or more additional instructions from the cache to replace the plurality of instructions in the instruction fetch buffer.

8. The design structure of claim 7 further comprising:
   based on the back invalidate being received, retrieving a second plurality of instructions from the cache into the instruction fetch buffer.

9. The design structure of claim 8 further comprising:
   determining that data referred to in the second instruction has become stale; and
   issuing the back invalidate to the instruction fetch buffer.

10. The design structure of claim 9 wherein determining that data referred to in the second instruction has become stale comprises monitoring memory locations referred to in the second instruction and issuing a back invalidate if the memory locations referred to in the second instruction have changed.

11. The design structure of claim 7 wherein the cache comprises an L1 cache.

12. The design structure of claim 11 wherein the L1 cache is configured to retrieve data from an L2 cache prior to attempting to retrieve data from a main memory.

* * * * *